(12) United States Patent
Grassler et al.

(10) Patent No.: US 6,231,902 B1
(45) Date of Patent: May 15, 2001

(54) MOUSSE CONTAINING STERILIZED PIECES OF CHOCOLATE

(75) Inventors: Walter Grassler, Polling; Manfred Wild, Meitingen, both of (DE)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 08/199,104

(22) Filed: Feb. 22, 1994

(30) Foreign Application Priority Data

Mar. 18, 1993 (EP) .................................................. 93104420

(51) Int. Cl.$^7$ ........................................................ A23B 1/00
(52) U.S. Cl. ..................... 426/103; 426/631; 426/564; 426/522; 426/572
(58) Field of Search ...................................... 426/631, 103, 426/564, 565, 93, 289, 613, 522, 572

(56) References Cited

U.S. PATENT DOCUMENTS 3,769,030 * 10/1973 Kleinert ................................ 426/631
3,959,516 * 5/1976 Warkentin ............................ 426/631

FOREIGN PATENT DOCUMENTS 59-196028 * 11/1984 (JP) ...................................... 426/631

* cited by examiner

Primary Examiner—Anthony J. Weier
(74) Attorney, Agent, or Firm—Vogt & O'Donnell, LLP

(57) ABSTRACT

Sterilized pieces of chocolate are contained in a mousse in an amount of between 2% and 10% by weight. The chocolate includes, by weight, from 1% to 10% sugar and also includes from 50% to 70% fats and 30% to 50% cocoa powder.

8 Claims, 5 Drawing Sheets

MOUSSE CONTAINING STERILIZED PIECES OF CHOCOLATE

BACKGROUND OF THE INVENTION

This invention relates to a refrigerated product based on at least one mousse and containing pieces of chocolate.

Refrigerated products containing pieces of chocolate are already available on the market. However, these known products have a storage life in a refrigerator of less than 10 days. This is because, from the moment when pieces of chocolate are dispersed in a mousse treated by UHT, the diffusion of water from the mousse into the chocolate creates microbiological problems because the chocolate is not sterilized on the other hand, due to the high sugar content of the chocolate, the diffusion of water breaks the crispy texture of the chocolate and the consumer no longer has any sensation of the presence of pieces of chocolate in the mousse.

SUMMARY OF THE INVENTION

The problem addressed by the present invention was to provide the consumer with a mousse-based product containing pieces of chocolate which would keep in a refrigerator for 5 to 6 weeks and in which the pieces of chocolate would remain intact over that period.

The present invention provides a refrigerated product based on at least one mousse and containing pieces of chocolate in which the mousse contains between 2 and 10% by weight of chocolate, the chocolate being sterilized and containing by weight from 50 to 70% of fats, from 30 to 50% of cocoa powder and from 1 to 10% of sugar and the chocolate may contain from 1 to 3% sugar.

DETAILED DESCRIPTION OF THE INVENTION

In the context of the invention, a mousse is understood to be an overrun milk-based product additionally containing sugar, a flavouring ingredient (such as cocoa, chocolate or the like), cream and a thickener or gelling agent. An overrun product is understood to be a product which has undergone an increase in volume of from 80 to 120% through overrunning. However, it is pointed out that these limits are not critical.

According to the invention, a product with a longer storage life can be obtained because the chocolate used has been sterilized, the mousse being treated by UHT before overrunning. This treatment is only possible because of the low sugar content of the chocolate. The sugar used in the chocolate is sucrose or invert sugar or fruit sugar, such as glucose.

The refrigerated product according to the invention normally contains, in a cup, two different mousses each containing pieces of chocolate in the proportions indicated above. The invention also encompasses a refrigerated product based on two mousses of which only one contains pieces of chocolate, and a product consisting of a single mousse containing the pieces of sterilized chocolate mentioned above. A surface layer based on cream, for example whipped cream, may also be provided. If the refrigerated product contains two mousses, filling may be carried out vertically or in horizontal layers.

In terms of fats, the chocolate used consists of cocoa butter. The pieces of chocolate are between 1 and 4 mm in size and are uniformly distributed throughout the mousse.

The product keeps in a refrigerator at a temperature of 4 to 8° C.

A process for the production of the refrigerated product mentioned above in which the chocolate is sterilized and the mousse is separately treated by UHT and then overrun, a strand or pieces of chocolate is/are simultaneously delivered to an injection nozzle substantially in the middle of the stream of mousse, the chocolate is cut and then mixed with the mousse, and the mousse is introduced into containers either on its own or in combination with a second mousse by means of a rotary metering head.

The chocolate is normally sterilized in a tank for 10 to 30 minutes at a temperature of 110 to 130° C. The mixture for the mousse is treated by UHT, i.e. for 5 to 40 seconds at a temperature of 130 to 150° C., and then overrun to obtain an increase in volume of 80 to 120%.

The chocolate has to be delivered to the injection nozzle in the liquid state, i.e., at a temperature of 25 to 30° C.

The mousse is delivered to the nozzle at a temperature of 8 to 12° C. When the two streams are combined, the strand of chocolate has to be given time to solidify. Accordingly, a contact time of 30 to 60 seconds has to be allowed before the strand of chocolate is cut.

In the embodiment based on the strand of chocolate, the strand and the mousse have to be delivered to the injection nozzle in such a way that they arrive at the same rate, namely at a rate of 0.05 to 0.15 m/s.

The rate at which the mousse and the chocolate arrive at the nozzle is not critical and depends on the desired output.

In the second embodiment of the process, pieces of chocolate are directly injected into the nozzle. This may be done, for example, with an alternating metering system comprising two lines each equipped with a valve, each of the lines alternately delivering the pieces of chocolate into the stream of mousse at a very high rate.

The strand of chocolate is cut in such a way that the pieces of chocolate have an average size of 1 to 4 mm.

The mousse containing the pieces of chocolate then arrives in a tank which feeds a volumetric metering head which in turn directly fills the cup placed beneath it in the case of filling with a single mousse. If the cup is filled with two mousses, one containing pieces of chocolate and the other containing no chocolate, a volumetric meter- ing unit for each mousse feeds a rotary metering head which then simultaneously delivers the two mousses into the cup.

Finally, also provided is an apparatus installation for carrying out the processes described above, comprising a UHT line for the preparation of mousse, a chocolate sterilization line, an injection nozzle joining the two lines, a cutting system for cutting the strand of chocolate, a rotary metering nozzle for filling a mousse containing pieces of chocolate and a normal mousse and a volumetric metering system for delivering each mousse to the rotary nozzle.

The mousse preparation line operates continuously with an overrunning system before the injection nozzle. The chocolate sterilization line operates discontinuously and consists of a tank equipped with a heating jacket for sterilization. Arranged at the tank exit is a pump which delivers the chocolate to the nozzle under a pressure of 2.5 to 3.5 bar.

The injection nozzle is the key element of the installation. It comprises a feed passage for the strand of chocolate and two feed passages for the mousse arranged symmetrically in relation to the feed passage for the strand of chocolate.

The cross-section of the chocolate feed passage depends on the pressure under which the chocolate arrives, the overrun of the mousse and the desired percentage of chocolate in the mousse which normally amounts to between 5 and 15% of the total cross-section of the stream of mousse.

As mentioned above with reference to the process, the streams of chocolate and mousse must remain in contact before the strand of chocolate is cut. The distance between the injection nozzle and the cutting system is between 5 and 8 m. This distance enables the strand of chocolate to arrive at a temperature of the order of 12° C.

The system for cutting the strand of chocolate consists of an enclosure in which is mounted a rotary shaft driven by a motor and comprising several blades. Downstream of the blades, paddles are provided on the rotary shaft to promote mixing of the mousse with the pieces of chocolate.

The cutting system is followed on the production line by a holding tank connected to a volumetric metering unit which in turn is connected to a rotary nozzle known and used in the field of deep-frozen foods and ice creams.

The production line is either of the aseptic type or of the highly hygienic type.

The invention is described in more detail with reference to the accompanying drawings.

DETAILED DESCRIPTION OF THE DRAWINGS

The illustrated product according to the invention packed in a cup (1) consists of a mousse (2) and a mousse (3) containing pieces of chocolate (4). The total weight of the product may be 60 g, i.e., 15 g per zone. Filling with the rotary metering head creates a spiral appearance. For example, the mousse (3) may be a plain chocolate mousse with pieces of chocolate while the mousse (2) may be a coffee or milk chocolate mousse (2).

Figure 1:
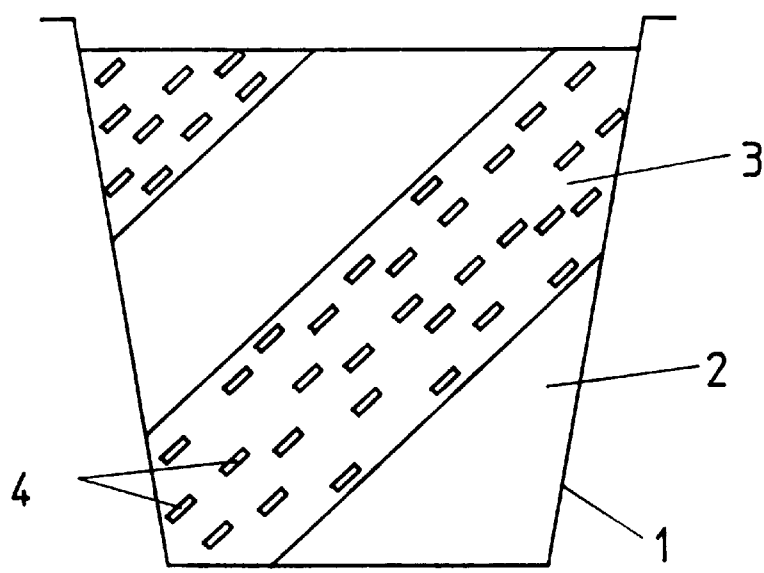
FIG. 1 is a side elevation of a refrigerated product according to the invention.
Figure 2:
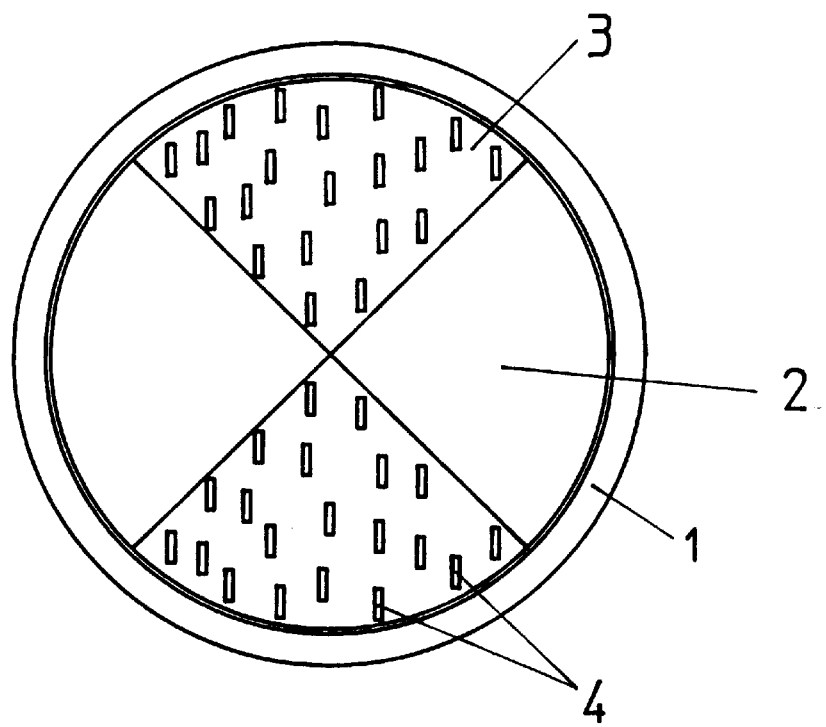
FIG. 2 is a view of the same product from above.
Figure 3:
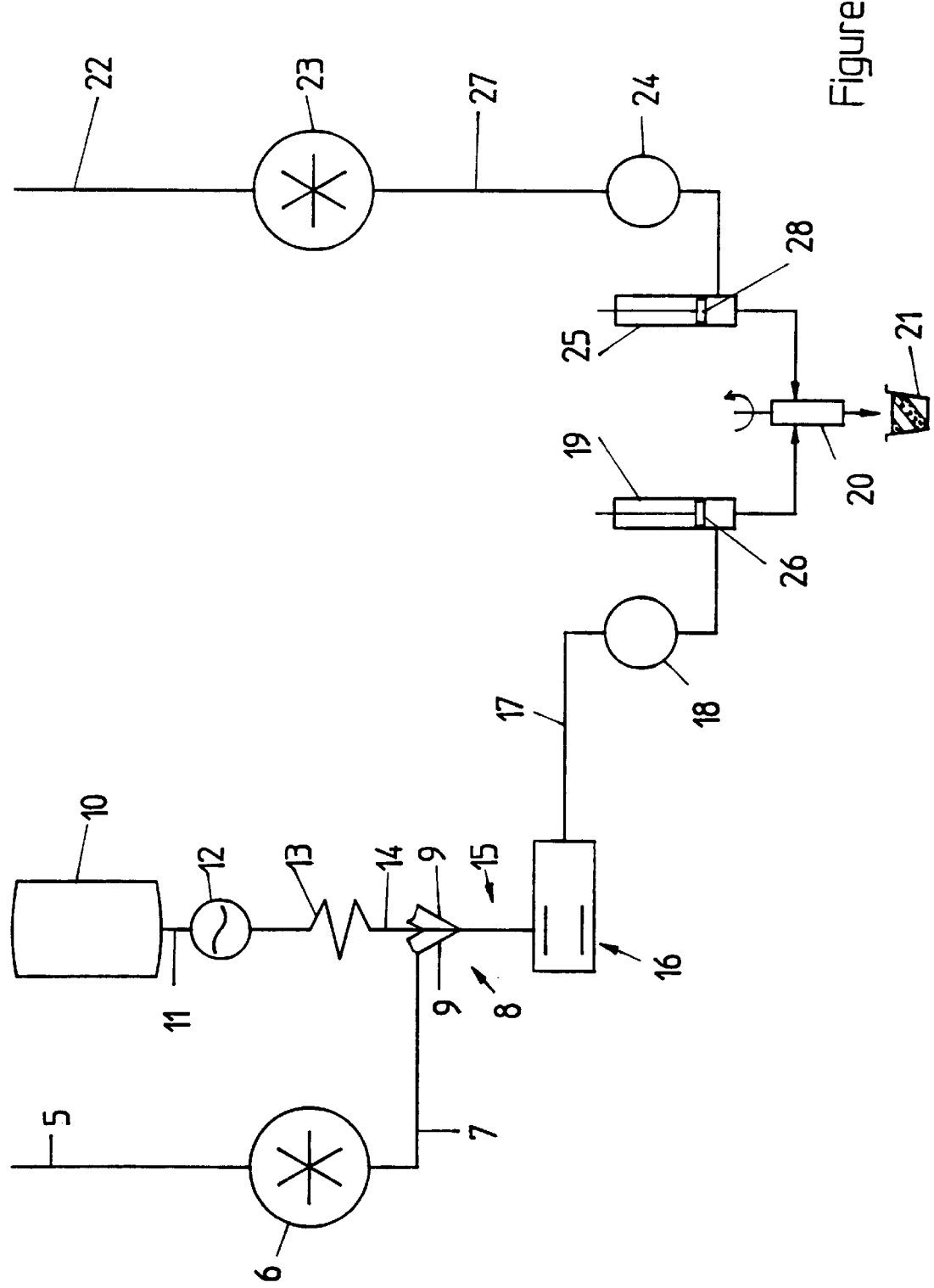
FIG. 3 diagrammatically illustrates a production line according to the invention.

Referring to FIG. 3, the mixture based on milk treated by UHT, which forms the mousse phase (3), arrives through the line (5). This mixture is overrun with nitrogen (or any other inert gas) in (6) so that an increase in volume of 120% is obtained.

The mousse (3) is delivered through the line (7) to the injection nozzle (8) which comprises two symmetrical feed passages (9).

The tank (10) is provided for sterilization of the chocolate. After sterilization, the chocolate passes through the line (11) and is delivered by the pump (12) to a cooling system (13) where the chocolate is cooled to around 30° C. It then passes through (14) to the injection nozzle (8).

A contact zone (15) is then provided in the form of a cylindrical tube in which the strand of chocolate solidifies in the stream of mousse. The cutting system (16) cuts the strand of chocolate and the mixture of mousse and pieces of chocolate is delivered through the line (17) into a tank (18) from which it passes into a volumetric metering unit (19) comprising a piston (26).

The mousse (2) is correspondingly prepared from the line (22) which brings the UHT-treated milk-based mixture to the overrunning station (23). The mousse passes through the line (27) into a tank (24) from which it is fed into the volumetric metering unit (25) comprising a piston (28).

The metering units (19) and (25) then deliver the respective mousses in measured quantities into the rotary nozzle (20) so that the cup (21) can be filled.

The injection nozzle, the cutting unit and the rotary metering unit are described in more detail with reference to the following Figures.

Figure 4:
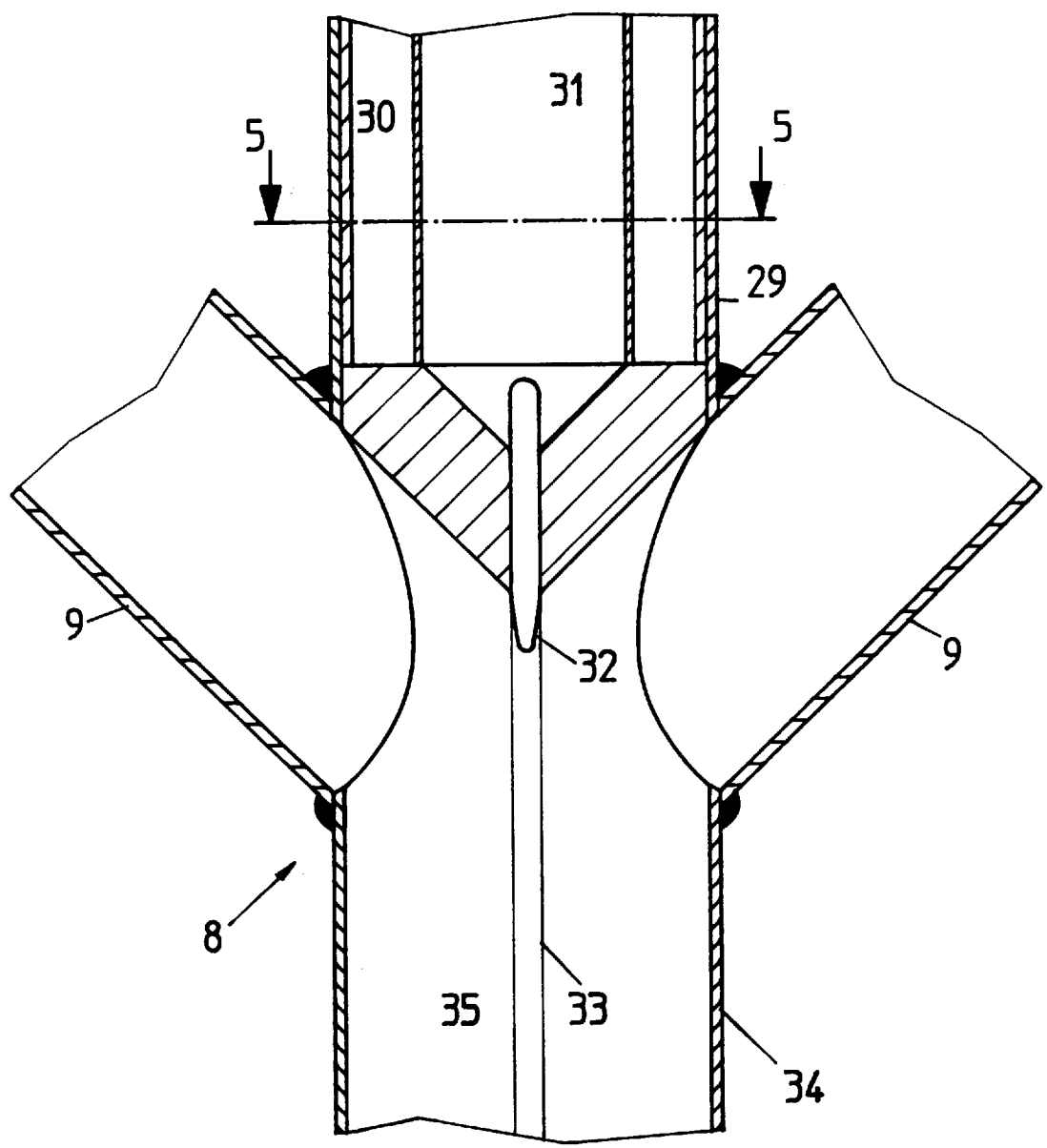
FIG. 4 diagrammatically illustrates an injection nozzle for obtaining a strand of chocolate.
Figure 5:
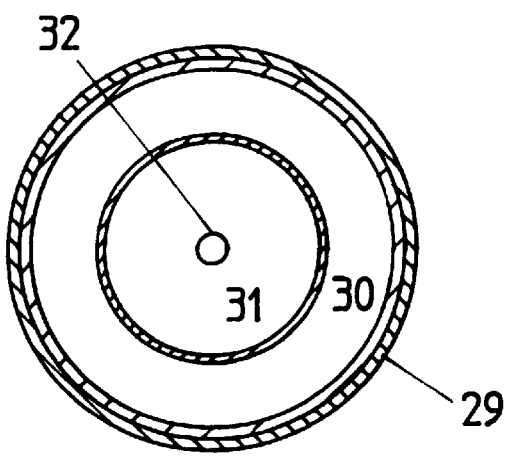
FIG. 5 is a section on the line 5—5 of FIG. 4.

FIGS. 4 and 5 show the injection nozzle (8) used in the installation shown in FIG. 3. This nozzle comprises two feed passages (9) for mousse and one feed passage (29) for chocolate, which is equipped with a heating jacket (30) to keep the chocolate in the liquid state, and the actual feed line (31) for the chocolate. The chocolate passes through the slot (32), which is round or oblong in shape, and forms a strand (33) in the mousse (35). As mentioned above, the line (34) is between 5 and 8 m in length.

Figure 6:
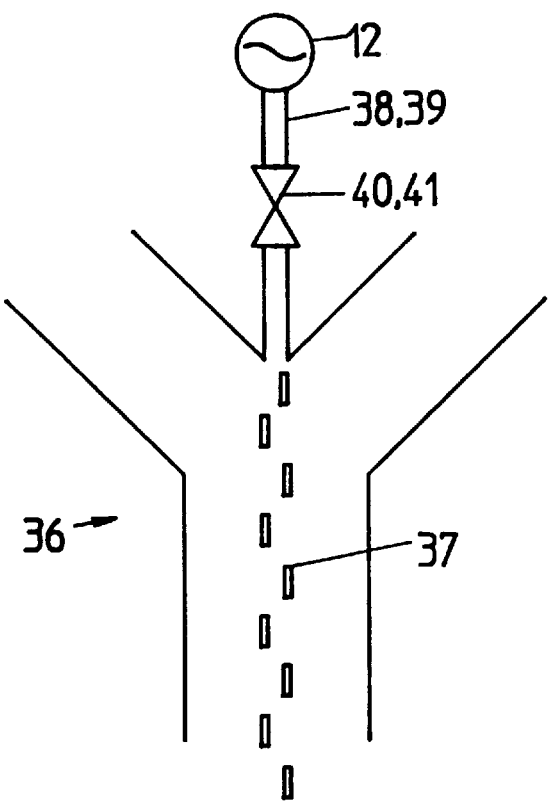
FIG. 6 diagrammatically illustrates an injection nozzle for obtaining pieces of chocolate.
Figure 7:
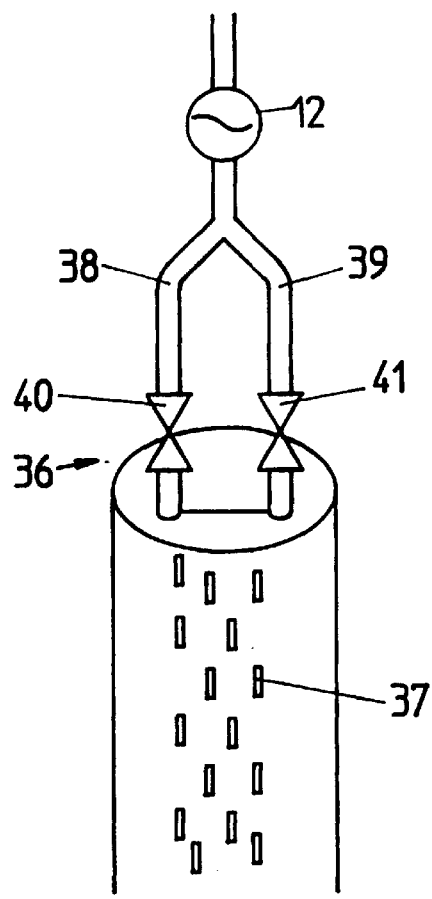
FIG. 7 is a diagrammatic illustration corresponding to FIG. 6, but at an angle of 90° in relation to FIG. 6.

FIGS. 6 and 7 show an embodiment of the injection nozzle (36) for directly obtaining pieces of chocolate (37). The feed stream of chocolate is separated after the pump (12) so that two streams (38, 39) are formed and the valves (40) and (41) are alternately opened and closed at a frequency of the order of one millisecond. Pieces of chocolate of the required size, i.e. 1 to 4 mm, are thus obtained.

Figure 8:
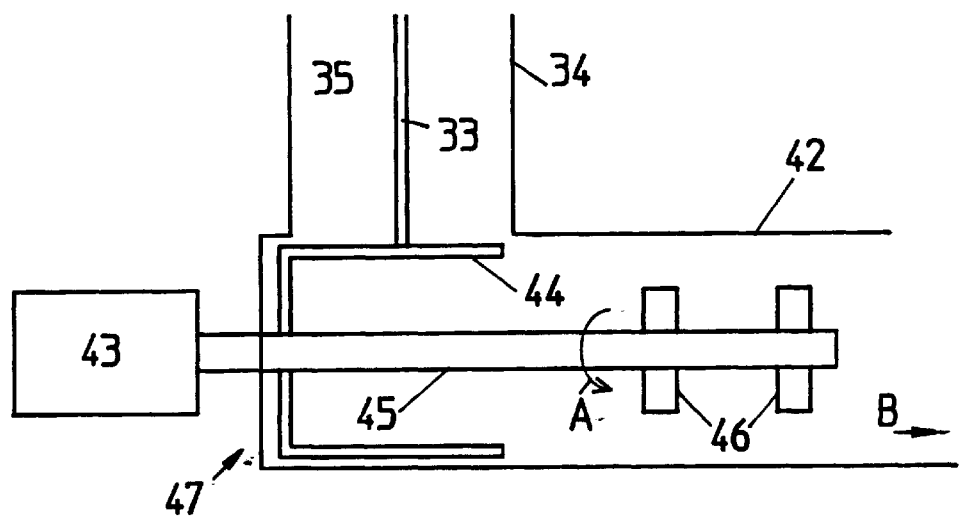
FIG. 8 diagrammatically illustrates a system for cutting the chocolate.

FIG. 8 shows the cutting system used in the installation shown in FIG. 3. The mousse (35) surrounding the strand of chocolate (33) arrives through the line (34) at the cutting station (47). The cutting station comprises in an enclosure (42) a rotary shaft (45) which is driven by a motor (43) and comprises blades (44) and mixing paddles (46). The shaft rotates in the direction of arrow (A) and the mixed product flows in the direction of arrow (B) to the tank (18). Six blades (44) are normally provided on the shaft.

The invention is further illustrated by the following Example.

Example

A refrigerated product according to the invention consists of chocolate pieces and a single plain chocolate mousse obtained from 65% (by weight) of skimmed milk, 14% of sugar, 7% of chocolate, 3% of cocoa powder, 5% of cream and known thickeners. The mousse makes up 94% and the chocolate pieces 6%.

The chocolate is made from 68% of cocoa butter, 30% of cocoa powder and 2% of sugar.

The chocolate pieces are sterilized for 15 minutes at 125° C.

The mixture of mousse ingredients is heat-treated for 120 seconds at 130° C. and then cooled to 80° C. It is overrun with nitrogen under 7 bar to obtain an overrun of 120%.

The mousse is delivered at 8° C. to an injection nozzle at a rate of 500 kg/h. The chocolate is delivered at a rate of 40 kg/h and with a temperature of 30° C. The cutting system rotates at 200 r.p.m. and the product is packed under completely hygienic conditions at a rate of 120 cups per minute.

What is claimed is:

1. In a mousse product wherein a mousse contains pieces of chocolate dispersed therein, the improvements comprising the pieces of chocolate being sterilized pieces of chocolate comprised of, by weight, from 50% to 70% fats, from 30% to 50% cocoa powder and from 1% to 10% sugar and being contained in the mousse in an amount of between 2% and 10% by weight.

2. A mousse product according to claim 1 wherein the sugar is in an amount of from 1% to 3% by weight.

3. A mousse product according to claim 1 or 2 wherein the sugar is selected from the group consisting of an invert sugar and a fruit sugar.

4. A mousse product according to claim 1 or 2 wherein the sugar is selected from the group consisting of sucrose and glucose.

5. A mousse product according to claim 1 or 2 wherein the sterilized chocolate pieces have a size of between 1 mm and 4 mm.

6. A mousse product according to claim 1 or 2 wherein the mousse product comprises two differing mousses and wherein only one of the mousses contains the sterilized chocolate pieces.

7. A mousse product according to claim 1 or 2 wherein the mousse product comprises two differing mousses and wherein each mousse contains the sterilized chocolate pieces.

8. A mousse product comprising a mousse containing sterilized pieces of chocolate wherein the sterilized chocolate pieces are comprised of, by weight, from 50% to 70% fats, from 30% to 50% cocoa powder and from 1% to 10% sugar and are con- tained in the mousse in an amount of between 2% and 10% by weight.

\* \* \* \* \*